July 9, 1957 — A. M. ANDREWS — 2,798,767
FERTILIZER DISSOLVER
Filed Oct. 28, 1954 — 2 Sheets-Sheet 1
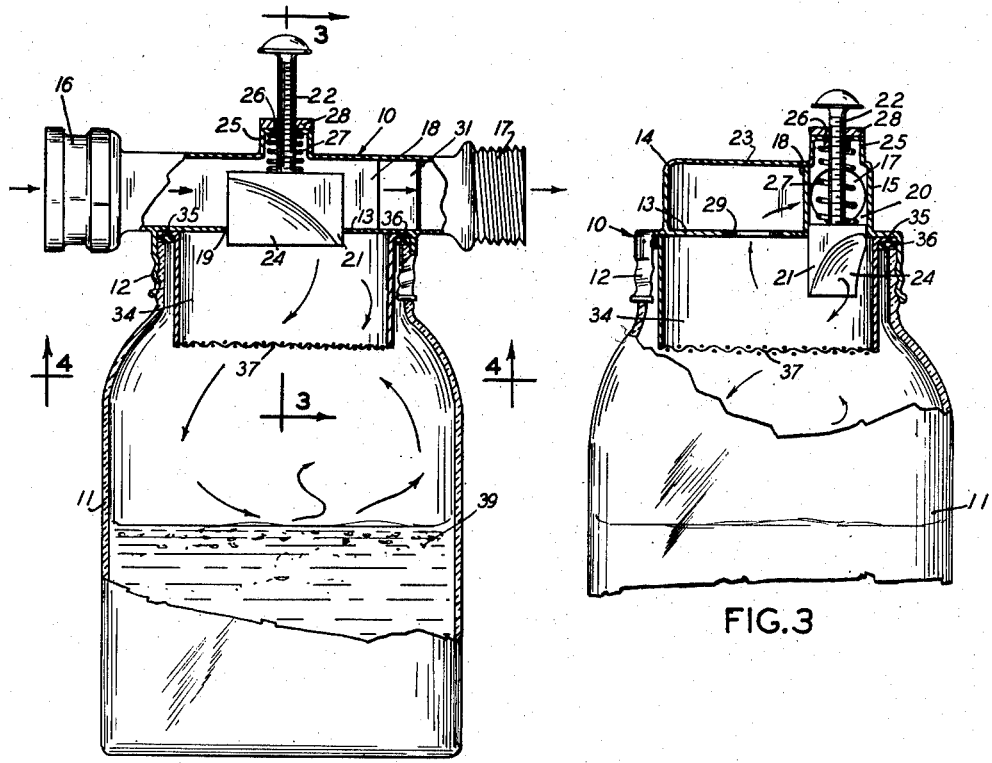
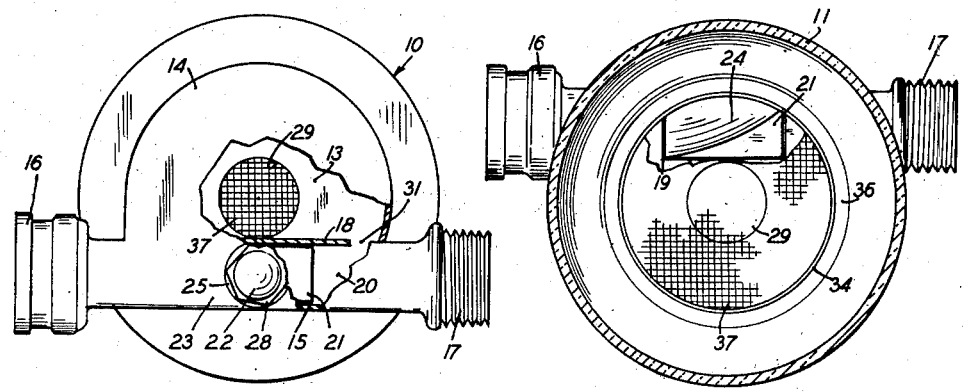
INVENTOR.
ALVADORE M. ANDREWS
BY
*Buckhorn and Cheatham*
ATTORNEYS July 9, 1957

A. M. ANDREWS 2,798,767

FERTILIZER DISSOLVER

Filed Oct. 28, 1954

INVENTOR.
ALVADORE M. ANDREWS
BY
Buckhorn and Cheatham
ATTORNEYS

United States Patent Office 2,798,767
Patented July 9, 1957

2,798,767

FERTILIZER DISSOLVER

Alvadore M. Andrews, Portland, Oreg., assignor to A. M. Andrews Co., Portland, Oreg., a corporation of Oregon Application October 28, 1954, Serial No. 465,201

3 Claims. (Cl. 299—84)

The present invention relates to apparatus for dissolving solid materials, and more particularly for apparatus for dissolving solid fertilizer materials and introducing the same to sprinkling and irrigating systems.

Numerous fertilizer dissolving devices of the general type indicated have been devised heretofore. However, most such prior art fertilizer dissolving devices have certain undesirable features limiting their use and effectiveness. Many are of complicated structure and, consequently, expensive to manufacture. Furthermore, most of these prior art devices may not be suitably regulated to dissolve the fertilizer at any desired rate. Also, in many of the prior art devices the means, if any, for preventing the escape of loose particulate fertilizer particles frequently becomes clogged and impairs the action of the dissolver.

It is an object of the present invention to provide a new and improved fertilizing dissolving apparatus that is simple in construction and which may be made at low cost of inexpensive materials.

Another object of the invention is to provide a fertilizer dissolving apparatus of the type indicated wherein the rate of the dissolution of the fertilizer may be easily controlled.

Still another object of the invention is to provide a fertilizer dissolving apparatus of the type indicated having filter means to prevent escape of solid fertilizer particles into the water stream, but so arranged that the filter is automatically swept clear of any clogging particles.

Further objects and advantages of the invention will become more apparent hereinafter.

In accordance with an illustrated embodiment of the invention, a cylindrical container is provided for receiving the fertilizer to be dissolved. A water distributing cap or head is provided at one end of the container for introducing water tangentially thereinto, the head having a water outlet at the center of the same for permitting the escape of water and dissolved fertilizer from the container. In a preferred embodiment of the invention, a screen is disposed across the outlet and the inflowing water is directed across the screen in such manner as to sweep the screen clear of impinging solid fertilizer particles.

For a more detailed description of the invention, reference is made to the accompanying drawings wherein:

Fig. 1 is a longitudinal, vertical section of one embodiment of the invention;

Fig. 2 is a top view of the embodiment of Fig. 1;

Fig. 3 is a cross-sectional view taken substantially along line 3—3 of Fig. 1;

Fig. 4 is a cross-sectional view taken substantially taken along line 4—4 of Fig. 1;

Figure 6:
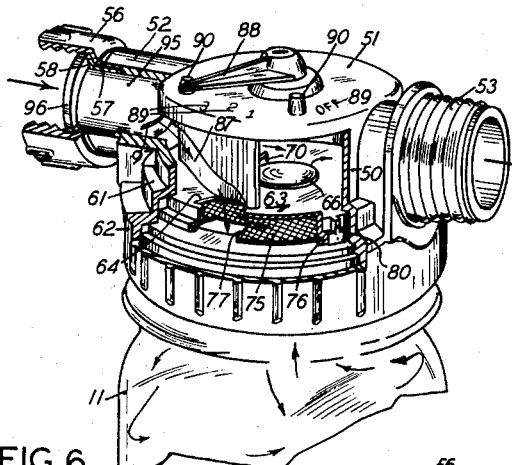
Fig. 6 is an enlarged, perspective view of the head and container disclosed in Fig. 5, certain parts of the head being broken away to show details of construction.

One embodiment of the invention is illustrated in Figs. 1 to 4, inclusive, and comprises a caplike device or head 10 adapted to be secured to the top of a cylindrical container which, in this instance, is shown as a conventional glass fruit jar 11, the head 10 having a cooperatively threaded base 12 so that it may be secured to the top of the jar.

Extending across the head above the base 12 is a wall 13 which forms a closure to the container and above which wall a water distributing housing 14 is provided. Referring to Figs. 2 and 3, the housing 14 includes a straight side wall portion 15 that is offset a substantial distance from the head axis and extends vertically above the closure wall 13. Adjacent one end of the wall 15 a water inlet is provided to the housing, and which conveniently may be a conventional female hose coupling 16. A water outlet for the housing is provided at the opposite end of the wall 15, and which outlet may comprise a male hose coupling 17. Extending from the inlet side partially across the housing parallel to the side wall 15 is a dividing wall 18 which forms a pipe, tube or passage 20 with the side wall. The wall 18 terminates short of the outlet side of the housing to provide an aperture 31 between the main portion of the housing and the outlet coupling 17 for a reason to be made apparent.

Formed in the bottom wall 13 between the walls 15, 18 is a rectangular opening 19 which provides a water inlet to the jar 11 from the tube or passage 20. The opening 19 extends entirely across the passage 20. A baffle or valve means is provided in the passage 20 for controlling the flow of water through the opening 19. In the present instance, this means comprises a valve including a blocklike body member 21 mounted on a threaded stem 22 extending upwardly through the top wall 23 of the housing. The downstream end of the valve body 21 is rectangular in cross section and is of such size as to substantially block the passage 20 when the body is raised fully into the tube, but is slightly undersized with respect to the width of the tube 14 so that the body may be raised or lowered in the tube without binding. With particular reference to Figs. 1 and 3, it will be noted that the body 21 is cut away diagonally upwardly and rearwardly from the lower downstream corner of the body spaced next adjacent the periphery of the cap to define a downwardly inclined vane 24. The topmost portion of the body 21 is rectangular in horizontal cross section and of a dimension just slightly smaller than the opening 19 whereby the opening will be substantially closed when the body is lowered to position the topmost portion thereof in the opening. The stem 22 passes through a dome 25 formed on the housing wall 23, suitable packing 26 being provided to prevent leakage of water between the stem and the opening in the dome through which the stem passes. A helical compression spring 27 is disposed about the stem 22 and is arranged to bias the body 21 downwardly through the opening 19. An adjusting nut 28 is threaded onto the outer portion of the stem 22 for raising the valve body 21 against the bias of the spring 27.

Provided in the center closure wall 13 is an outlet opening 29 through which water may escape from the jar 11, the main portion of the housing providing a duct for conducting water through the aperture 31 into the outlet 17.

Mounted beneath the closure wall 13 is a screen means including a tubular body 34 having a flange 35 at its upper end adapted to engage between closure wall 13 and the top of the container 11. A gasket 36 may be provided between the flange 35 and jar rim to form a liquid-tight seal. The body 34 extends downwardly a short distance into the jar 11, and across the lower end thereof is secured a fine mesh screen 37 for the purpose of preventing escape of fertilizer particles from the container before they are dissolved.

In operation, the jar 11 is filled with the desired quantity of particulate fertilizer indicated at 39 and the coupling 16 is coupled to a garden hose or other suitable source of water. The outlet 17 is connected to the sprinkling apparatus (not shown) through which the dissolved fertilizer is to be distributed. Before the water is turned on, the nut 28 is preferably adjusted so that the valve body 21 is moved downwardly by the compression of the spring 27 until the upper rectangular portion of the body is within the opening 19 to prevent water from flowing into the jar 11. The water is then turned on and regulated so that the desired amount is flowing from the sprinkling apparatus. The nut 28 is then adjusted to raise the valve body 21, whereupon the vane 24 will cause a portion of the water flowing into the passage 20 to be diverted into the jar 11. As will be evident, the vane 24 will cause the water to be directed tangentially relative to the wall of the jar 11 and the wall of the screen body 34, whereupon the water will swirl downwardly, as indicated by the arrows in Fig. 1, upon the upper surface of the fertilizer 39 to agitate and dissolve the same. From the surface of the fertilizer 39 a central, upwardly flowing current of water will be established which will flow upwardly through the outlet opening 29 and through the aperture 31, and thence through the outlet 17 to the sprinkling apparatus. The nut 28 is adjusted until the water is diverted into the jar 11 at the desired rate, which will vary, of course, depending upon the difficulty of dissolving the fertilizer and the rate at which it is desired the fertilizer be dissolved. The spring 27 prevents the body 21 from rising due to the planning action of the vane 24 against the incoming current of water. As the valve body is raised by adjusting the nut 28, the spring 27 may compress into the dome 25, as shown in Fig. 1.

It will be noted that the water introduced into the jar 11 must sweep downwardly and across the outer face of the screen, that is, the face which is outward relative to the interior of the jar 11. This action causes any particulate fertilizer swept by the outflowing current of water against the lower, inner face of the screen to be carried back into the jar 11. Ordinarily, the currents of water will not be steady but will be constantly changing position so that the incoming stream of water will effectively sweep substantially the entire surface of the screen 37 to keep the same clear.

Figure 5:
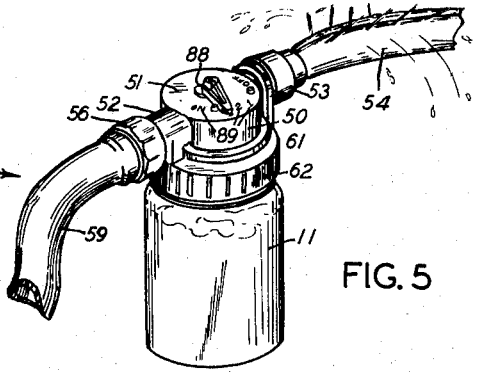
Fig. 5 is a fragmentary, perspective view of a sprinkling system incorporating a preferred embodiment of a distributing head.
Figure 7:
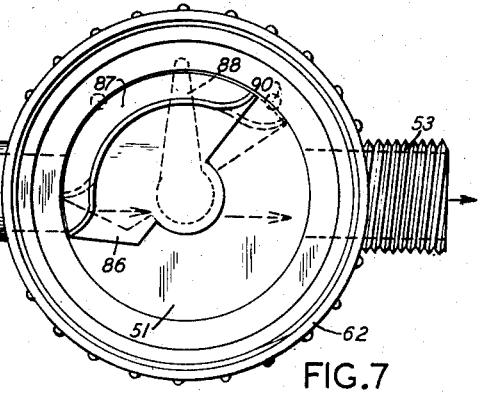
Fig. 7 is a bottom view of the preferred head, with a portion removed to show more clearly certain parts.
Figure 8:
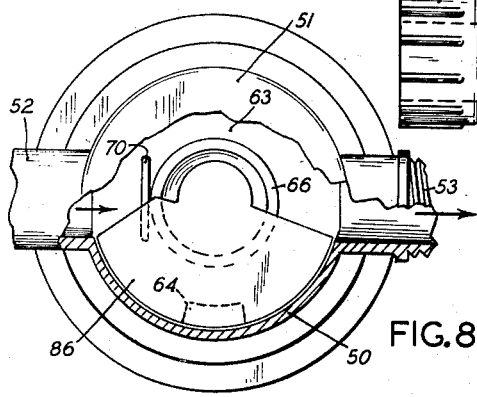
Fig. 8 is a top view of the head with a portion broken away, again more clearly to show the construction.

A preferred embodiment of the invention illustrated in Figs. 5 to 11, inclusive, likewise takes the form of a cap or head adapted to be secured to the top of a jar 11. The present embodiment comprises an integral outer housing having a top portion including a vertical, cylindrical side wall 50 and a flat, horizontal top wall 51. Formed integrally with and opening through the side wall 50 is an inlet tube 52 and a diametrically opposite outlet tube 53. The outlet tube may be threaded on its outer end to form a male coupling connected to a sprinkling device, which is shown in the form of a perforated hose 54 (Fig. 5). A female coupling element 56 is secured to the inlet tube 52 by means of a bushing 57 extending within the inlet tube and suitably secured thereto, the bushing having an outwardly turned flange 58 at its outer end cooperatively engaging the coupling element 56, all as shown most clearly in Fig. 9. A water supply hose 59 is connected to coupling element 56 (Fig. 5).

Figure 9:
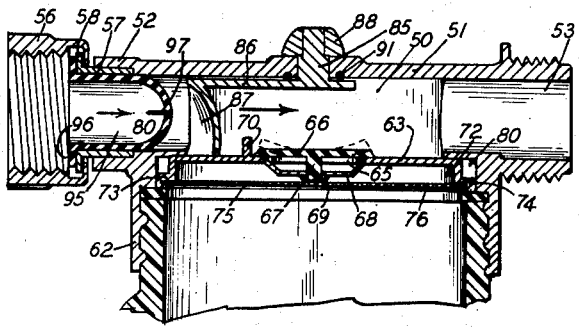
Fig. 9 is a medial section of the head in side elevation.
Figure 11:
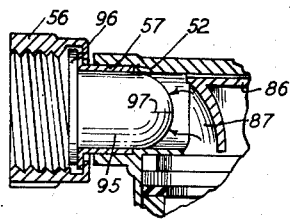
Fig. 11 is a fragmentary view, partly in section, showing details of the functioning of an antisiphoning device that may be incorporated in the apparatus of the invention.

The cap is flared or stepped outwardly beneath the side wall 50 to provide a short step 61 and is likewise stepped outwardly beneath the step 61 to provide a base portion 62 having inner threads adapted cooperatively to engage the threads of the jar 11. Suitably secured to the housing in the step 61 is a disclike member including a wall portion 63 extending across the housing and which, with the side wall 50 and top wall 51, provides a water distributing chamber for the water flowing from the inlet 52. The wall 63 is provided with an opening 64 therethrough adjacent the side wall 50 and substantially medially between the inlet 52 and outlet 53 as may be seen best in Figs. 6 and 8. A second opening 65 is provided in the center of the chamber bottom wall 63, and preferably a valve or other suitable means is provided thereacross for preventing flow of water therethrough to the jar 11. In the present instance this valve comprises a circular rubber disc 66 disposed across the opening 65 and having a coaxial rubber stem 67 extending downwardly beneath the wall 63. The lower end of the stem is received through a cooperating aperture formed in a spider bracket 68, the lower end of the stem having a flange 69 thereon to secure the same to the bracket as shown in Fig. 9. Extending upwardly from the upper surface of the wall 63 adjacent the edge of the disc 66 on the side thereof toward the inlet 52 is a slight projection 70 which provide a baffle that causes the stream of water coming from the inlet to flow up and over the disc 66, thus preventing the stream from lifting the edge of the disc and flowing into the jar 11 through the opening 65.

Again referring to Fig. 9, the disc member is provided with a short tubular portion 72 extending downwardly from the wall 63. Extending outwardly from the lower end of the tubular portion 72 is a flange 73 defining a downwardly facing shoulder 74 for receiving the edges of circular screen 75 of suitable mesh. The screen 75 is secured in position against the shoulder 74 by means of the reversely crimped edge 76 of the flange 73. Preferably a portion of the screen 75 is cut out to form an unobstructed opening 77 of similar configuration to and spaced directly beneath the opening 64, as shown in Fig. 6.

With further reference to Fig. 6, the disc member is secured within the outer housing by means of a plurality of ribs 80 which extend outwardly of the tubular portion 73 and are adapted to frictionally engage the side wall of the step 61, as by a press fit.

Adjustable valve or baffle means is provided for diverting a desired portion of the water from the inlet 52 through the opening 64 downwardly into the jar 11. In the present instance, the baffle means comprises a cast body shown in side elevation in Fig. 10 and mounted within the water distributing chamber and having a stem 85 extending upwardly through the center of the top wall 51, as shown in Fig. 9. The body includes a flat, platelike portion 86 lying adjacent the top wall 51 and a vane portion 87 which defines a surface suitably shaped so that in certain positions of the body, as will be further explained, a portion of the incoming stream of water from the inlet 52 is deflected through the opening 64 into the jar 11. For adjusting the position of the body, an operating lever 88 is secured to the stem 85 and suitable indicia 89 provided on the outer surface to indicate the relative position of the body. Limit stops in the form of pins 90 may be provided. An O-ring 91 may be provided in the wall 51 about the stem 85 to prevent water from escaping about the stem.

In using the present embodiment, the fertilizer to be mixed or dissolved is placed in the jar 11 and a water supply hose and sprinkler attached to the inlet and outlet couplings, respectively, of the device. The operating lever 88 is preferably moved to "off" position so as to move the baffle body to the relative position shown in Fig. 8 and in which position the stream of water from the inlet 52 is unintercepted by the baffle vane 87 so that the entire stream flows through the chamber and outlet 53 without being passed into the jar 11. After the water rate is satisfactorily adjusted, the lever 88 is slowly moved toward the full "on" position. This will cause the vane to be moved into position to intercept the inlet water stream. By proper adjustment, the vane can be positioned to intercept a portion of the stream or all of it. For example, in Fig. 7 the full "on" position of the baffle body is shown in solid lines, and it will be seen that the vane 87 is positioned to catch the entire stream of water entering through the inlet 52. An intermediate position of the baffle body is indicated in dotted lines in Fig. 7, and in which position it will be noted that approximately one half of the entering stream will be intercepted by the baffle whereas the other half of the stream may flow directly to the outlet 53 as indicated by the arrows in dotted lines.

With particular reference to Fig. 6, which shows the baffle body in the full "on" position, the vane 87 directs the incoming stream of water downwardly into the jar 11 through the opening 64. The stream passing through the opening 64 will not flow directly downwardly but, as will be apparent, will flow angularly downwardly and, by reason of the confining walls of the cap and jar 11, will swirl downwardly in the jar in a counterclockwise direction as the device is shown. The screen opening 77 is provided so that the major portion of the stream will not be diffused and broken up, as would occur if the stream passed through the mesh of the screen. The portion of the stream of water passing through the screen opening 77 swirls downwardly along the side of the jar to impinge upon the fertilizer particles to agitate the same and aid their dissolution as in the previously described embodiment, but in the present instance the agitation is somewhat more effective because of the continuity of the stream. The pressure of the entering water causes an escaping stream of water to flow upwardly through the center portion of the jar, through the screen 75, finally lifting the valve disc 66 and escaping through the outlet 65. The lever 88 is adjusted in accordance with the area being sprinkled and the solubility of the fertilizer so that the fertilizer is dissolved at the desired rate.

Certain kinds of fertilizer materials are dissolved rather slowly so that it is necessary to position the baffle in the full "on" position to cause a vigorous agitating stream of water to flow through the jar 11. Such a vigorous stream will carry undissolved fertilizer particles against the screen 75, which prevents their escape to the sprinkler as is desired since the particles may clog the openings in perforated hose type sprinklers and also may burn the vegetation being sprinkled should they fall thereupon undissolved. However, unless the particles are somehow removed from the screen 75, a deposit may build up that hampers the escape of the water through the screen. The construction of the present embodiment prevents such a deposit from forming, as will now be explained.

It has been pointed out before that the stream of water flowing through the opening 64 does not flow directly downwardly but instead flows angularly downwardly. Since the screen 75 is spaced from the wall 63, a small portion of the downwardly flowing stream of water will be directed toward the portion of the screen adjacent the opening 77, as may be seen in Fig. 6. The portion of the stream intercepted by the screen will flow across the top or inner face thereof and finally downwardly into the jar, carrying away any particles previously swept against the screen by the outflowing stream. The outflowing stream fluctuates in position so that the water flowing downwardly through the screen is able to effectively clear the screen.

Figure 10:
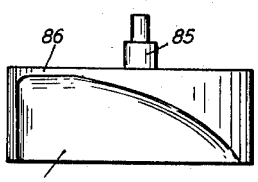
Fig. 10 is a side elevation of the water directing baffle incorporated in the head of the preferred embodiment.

Preferably, to prevent the possibility of contamination of the water source, antisiphon means is provided to prevent any flow of liquid from the jar or cap towards the water source in the event a siphoning condition should occur which would normally tend to draw liquid from the cap. Such means comprises a thimble shaped member or element 95 formed of rubber or like resilient material. The element 95 is adapted to be mounted within the inlet tube 52 and includes a tubular side wall portion fitting snugly against the wall of the tube 52. The open end of the element is formed with an outwardly turned flange 96 for engaging against the face of the inlet tube flange 58. The dome shaped closed end of the element 95 is provided with a slit cut 97. As indicated in Fig. 6, the pressure of water coming from a hose coupled to the inlet tube 52 will force the lips of the slit 97 apart to permit water to flow into the head. However, in the event a siphoning condition is set up wherein the pressure of the water in the head becomes greater than the pressure in the hose so that the normal flow tends to reverse, the greater pressure in the head will cause the opposite portions of the dome shaped end to compress together, forcing the lips of the slit 97 together as shown in Fig. 10 whereby such reverse flow is prevented.

While particular reference has been made to the use of the invention to dissolve solid fertilizer in particulate form, the apparatus of the invention is equally adapted for other water soluble materials such as soluble insecticides. Also, by proper adjustment of the control lever 88, apparatus of the invention may be used to effect a mixing of a liquid material with water so as to distribute the material with the water as it is sprinkled.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:

1. In a fertilizer dissolving apparatus of the class described, a cylindrical open top container adapted to receive the fertilizer to be dissolved, a cap for said container, a filtering device suspended in said container comprising an imperforate, tubular side wall portion concentric with said container and abutting at its top end against said cap and extending downwardly into said container, and a filter screen portion secured across the bottom end of said side wall portion, and passage means for passing into and subsequently removing from said container water for dissolving said fertilizer carried by said cap, said passage means being adapted at one end for connection to a source of water, an opening from said passage means through said cap within the bounds of said tubular wall portion, a diverting valve in said passage means for diverting through said opening and impinging tangentially upon the inner wall of said tubular side wall portion at least a part of the water passing through said passage means to provide a body of water in said container swirling about the axis thereof, and duct means extending between an outlet opening in the center of said cap and an opening in said passage means downstream of said valve for conducting water from the portion of said swirling body of water adjacent said axis and said cap for said container.

2. A fertilizer dissolving apparatus comprising a caplike device having a threaded base for securing said device upon a cylindrical jar containing a supply of fertilizer to be mixed or dissolved, a water distributing chamber above said base defined by a bottom wall, a cylindrical side wall coaxial with said base and a top wall spaced from said bottom wall, said side wall having a water inlet therethrough and a water outlet diametrically opposite said inlet, said bottom wall having a first opening therethrough adjacent the edge thereof and a second opening in the center thereof, adjustable baffle means in said chamber for diverting through said first opening a desired portion of the water flowing into said chamber, means extending through said top wall for adjusting the position of said baffle means, said baffle means being constructed and arranged to cause the diverted stream of water flowing through said first opening to be directed tangentially and downwardly into said jar to provide a body of water in said jar swirling about the axis thereof, said second opening defining an escape outlet for withdrawing water carrying dissolved fertilizer from the portion of said swirling body of water adjacent said axis and said cap, and a check valve across said second opening for preventing flow of water from said chamber through said opening.

3. A fertilizer dissolving apparatus comprising a caplike device having a threaded base for securing said device upon a jar containing a supply of fertilizer to be dissolved, a water distributing chamber above said base defined by a bottom wall spaced closely adjacent the top of said jar when said device is secured thereto, a cylindrical side wall coaxial with said base and a top wall integral with said side wall at the top thereof, said side wall having a water inlet therethrough and a water outlet substantially opposite said inlet, said bottom wall having a first opening therethrough adjacent the edge thereof and a second opening in the center thereof, a screen beneath said bottom wall and spaced a slight distance therebelow, means securing the periphery of said screen in sealed relation to the periphery of said bottom wall, said screen being cut away immediately beneath said first opening to define a hole therethrough substantially of the outline of the projection from said first opening, adjustable baffle means in said chamber for diverting through said first opening a desired portion of the water flowing into said chamber, and lever means extending through said top wall for adjusting the position of said baffle means, said baffle means being constructed and arranged to cause the stream of water flowing through said first opening to be directed tangentially and downwardly into said jar whereby a part of said stream will be intercepted by the edge of said screen defining said hole to divert said part across the face of the screen next adjacent said bottom wall, said second opening defining an escape outlet for the water carrying dissolved fertilizer.

References Cited in the file of this patent
UNITED STATES PATENTS

| | | |
|---|---|---|
| 461,235 | Butler | Oct. 13, 1891 |
| 811,749 | Somers | Feb. 6, 1906 |
| 996,588 | Kennedy | June 27, 1911 |
| 1,930,500 | Archibald | Oct. 17, 1933 |
| 2,601,672 | Gatchet | June 24, 1952 |
| 2,606,068 | Bonacor | Aug. 5, 1952 |
| 2,621,156 | Farrell | Dec. 9, 1952 |
| 2,646,973 | Prizer | July 28, 1953 |
| 2,682,428 | Roberts | June 29, 1954 |